United States Patent Office 3,705,150
Patented Dec. 5, 1972

3,705,150
PROCESS FOR THE PREPARATION OF 21-DEOXY - 21-N-(N'-METHYLPIPERAZINYL)-PREDNISOLONE AND SALTS THEREOF
Zoltan Tuba, Solyom, Maria Bor, nee Szabo, Ferenc, Zoltan Komesz, Marga, Eva Weitner, nee Vari, Pataki, and Sandor Gorog, Vajda, Hungary, assignors to Richter Gedeon Vegyeszeti Gyra R.T.
No Drawing. Filed Apr. 27, 1971, Ser. No. 137,950
Claims priority, application Hungary, May 13, 1970, 389
Int. Cl. C07c 173/10
U.S. Cl. 260—239.5           5 Claims

ABSTRACT OF THE DISCLOSURE

This invention relates to a process for the preparation of 21-deoxy-21-N - (N' - methylpiperazinyl-prednisolone and salts thereof formed with nontoxic mineral or organic acids.

FIELD OF THE INVENTION

This invention relates to a process for the preparation of 21 - deoxy-21-N-(N'-methylpiperazinyl)-prednisolone and salts thereof formed with non-toxic mineral or organic acids.

BACKGROUND OF THE INVENTION

The above compound is a glucocorticoid, which can be administered for the treatment of haemorrhagical and surgical trauma, anaphylaxic trauma, and in the conditions of acute allergia status asthmaticus, etc. in the form of intravenous injections. This compound can also be used in the form of ear, nose or eye-lotions, and, because of its favorable resorption, as an active ingredient in ointments.

It is well known, that the water-soluble derivatives of practically water-insoluble steroids are of great therapeutical value; and in the recent past several attempts have been made at the preparation thereof.

According to Hungarian Pat. No. 150,350, prednisolone and hydrocortisone derivatives, wherein a piperazino-substituent is attached at the 21 position, are prepared by reacting prednisolone 21-p-toluenesulfonic acid ester or the corresponding 21-iodo-derivative with the appropriate piperazine derivatives. The reaction is carried out in tetrahydrofurane, and an excess of the piperazine reagent is added. In the above reaction 21-deoxy-21-N-N'-piperazinyl)-derivatives are obtained, which form water-soluble salts.

Among the above-mentioned compounds, 21-deoxy-21-N-(N' - methylpiperazinyl)-prednisolone dihydrochloride proved to be an excellent therapeutic agent in clinical practice. This compound is prepared according to the above patent as follows: Prednisolone-21-p-toluenesulfonic acid ester, or the corresponding 21-iodo-derivative is reacted with excess of N-methylpiperazine. The reaction is carried out in tetrahydrofurane or in another inert solvent, as listed in Hungarian Pat. No. 150,350. The obtained product, 21-deoxy-21-N-(N'-methylpiperazinyl)-prednisolone partially separates, or remains in the solution, depending on the actual circumstances. The N-methylpiperazine p-toluenesulfonate or -hydroiodide, formed in the reaction as by-product, has similar solubility features, depending on the nature of the solvent. Accordingly, the product can only be isolated from the by-products and other contaminants by pouring the reaction mixture into water, or by evaporating the solvent and suspending the residue in water. In the course of this procedure the product precipitates from the solution, while the by-products remain dissolved.

The resulting steroid base is recrystallized, and converted to the corresponding dihydrochloride as described in Hungarian Pat. No. 150,350.

The process reported in Hungarian Pat. No. 150,350 has several disadvantages, which result mainly from the working-up of the mixture in aqueous medium. As a consequence, the yield of the process is rather poor, and the obtained product cannot be used for the preparation of aqueous pharmaceutical products, in spite of the fact that recrystallized 21-deoxy-21-N-(N-methylpiperazinyl)-prednisolone has been used as a starting substance.

In the course of working-up in aqueous medium, 21-deoxy-21-N-(N' - methylpiperazinyl)-prednisolone separates in a quasi-colloidal state; consequently the filtration of the precipitate is difficult, and requires a long time.

The side-chain of 21-deoxy - 21 - N - (N-methylpiperazinyl - prednisolone has an α - aminoketone - structure accordingly it is sensitive to attack by oxygen. During this long filtration period, the side-chain is partially oxidized to form a so-called prednisolone-21-aldehyde hydrate, which in turn, depending on the pH-value of the suspension, converts partially to the corresponding acid in an intramolecular Cannizzaro reaction.

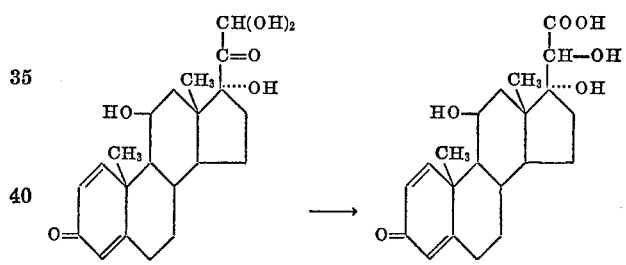

These by-products are found in the end-product as contaminants.

The steroid base contains several hydrophilic groups (e.g. hydroxyl, N-methylpiperazino and oxo groups) causing this compound to dissolve to a small extent in water. The concentration of its saturated aqueous solution is about 0.5%. As the mixture is worked up in large quantities of aqueous medium and the product is washed several times with water, a considerable weight loss occurs due to a slight, but detectable dissolution of the steroid base. Moreover, due to the hydrophilic character of the molecule, the dry product contains about 6 to 7 percent of water, which cannot be removed without the risk of decomposition. The water-soluble salts of the above steroid are prepared in completely dry medium, consequently, if this air-dry product, containing about 6 to 7 percent of water is used as the starting substance, a further weight loss occurs due to the dissolution of the salts.

Moreover, during the preparation of the steroid base, a side reaction takes place, and a betaine type compound of the formula

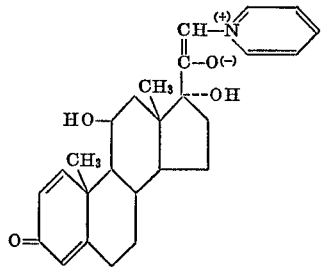

is formed. This vivid yellow-colored substance precipitates together with the steroide base in the course of the aqueous recovery process, and can only be removed by a difficult crystallization process, causing further weight losses.

DESCRIPTION OF THE INVENTION

Now we have found, that if the reaction is carried out in an acetonitrile-benzene mixture of 60:40 to 40:60 volume ratio, an easily filterable product separates from the mixture with a yield of 90 to 95% and with a purity grade of 97%. If the reaction is carried out in the presence of an alkali metal halide—preferably alkali metal iodide—catalyst, the reaction time is considerably reduced. It is to be mentioned that satisfactory results can only be obtained if an acetonitrile-benzene mixture of the above composition is used.

A further advantage of the process of the invention is that the free steroid base can be used directly, without any further purification, for the preparation of the corresponding water-soluble salts. The salts are obtained in high purity, and completely fulfil the requirements of pharmaceutical aqueous preparations.

In our process, the products still dissolved in the mother liquor can also be separated and utilized.

Accordingly, the present invention relates to a process for the preparation of 21-deoxy-21-N-(N'-methylpiperazinyl)-prednisolone and acid-addition mono-salts thereof usable for the production of aqueous pharmaceutical preparations by reacting prednisolone-21-mesyl ester with N-methylpiperazine, and optionally converting the resulting product into its salts. The starting substances are reacted in an acetonitrile-benzene mixture of 60:40 to 40:60 volume ratio, preferably in the presence of an alkali metal halide and/or alkaline earth metal halide, the precipitated product is separated according to known techniques, and/or the obtained 21-deoxy-N-(N'-methylpiperazinyl)-prednisolone is converted in a dilute acidic medium to its mono-salts of one of the nitrogen atoms, usable for the preparation of aqueous pharmaceutical products; this salt is separated from the mixture in a manner known per se, further, if desired, the 21-deoxy-21-N-(N'-methylpiperazinyl)-prednisolone, still dissolved in the mother liquor, is separated from the by-products by converting it into its di-salt formed at both of the nitrogen atoms, the obtained di-salt is either reacted continously with 21-deoxy-21 - N - (N' - methylpiperazinyl)-prednisolone base to form the corresponding mono-salt, or it is converted to the free 21-deoxy-21-N-(N'-methylpiperazinyl)-prednisolone base with an alkali metal hydroxide, and the resulting free steroid base is converted to its mono-salt formed at one of the nitrogen atoms, usable for the preparation of aqueous pharmaceutical products, in a way known per se.

More particularly, 21-dexoy-21-N-(N' - methylpiperazinyl)-prednisolone is prepared according to the invention as follows: crude prednisolone-21-mesyl ester is dissolved in a 60:40 mixture of acetonitrile and benzene under an inert gas atmosphere; thereafter the ester is reacted with about a two-fold excess of N-methylpiperazine at 25 to 80° C., preferably at 50 to 60° C. The initially heterogeneous mixture turns temporarily homogeneous after 20 minutes of heating, then the formed 21-deoxy-21-N-(N'-methylpiperazinyl)-prednisolone rapidly begins to separate. After about 4 hours of reaction, the mixture is cooled to room temperature, the crystalline product—which precipitates in a quantity of about 90 to 95 percent—is separated, washed with a 60:40 mixture of acetonitrile and benzene, and dried.

According to our observations, only the above-mentioned solvent mixture is able to provide the favorable solubility conditions, i.e. that 21-deoxy-21-N-(N'-methylpiperazinyl)-prednisolone of 97 percent purity grade separates from the mixture with a yield of at least 90 percent, while the excess N-methylpiperazine and the by-products, namely N-methylpiperazine methanesulfonate and the above mentioned betaine-type compound, which has an intensive yellow color due to its mobile electron-system, remain in the mother liquor. Taking into consideration that only the desired product separates from the mixture, the above mentioned disadvantageous aqueous separation may be omitted.

According to a preferred method of the invention, the above reaction is carried out in the presence of an alkali metal iodide catalyst. In this latter case the reaction time is considerably reduced, and snow-white, inclusionless small crystal grains separate.

Both of the above-mentioned methods provide a product with 90 to 95 percent yield, which can be directly used for the preparation of pharmaceutically acceptable acid adddition salts of 21-deoxy-21-N-(N'-methylpiperazinyl)-prednisolone, usable for the preparation of aqueous pharmaceutical products. These salts are preferably prepared as follows: 21 - deoxy-21-N-(N' - methylpiperazinyl)-prednisolone base is dissolved in dry ethanol, then the pH of the solution is adjusted to 5.1±0.3, e.g. with ethanolic hydrochloric acid. After stoichiometric amount of the ethanolic acid is added, the mixture, containing crystals of 21-deoxy-21-N-(N'-methylpiperzinyl)-prednisolone salt is cooled to 0.5° C., maintained for some hours at this temperature, finally it is filtered or centrifuged, and solid is dried.

In the present process care must be taken to adjust the pH. According to our investigations, the pH value of aqueous solutions of 21-piperazine dihydrochloride compounds described in Hung. Pat. No. 150,350 is 2.1. At this pH value the salts decompose within some hours to form a compound of the structure

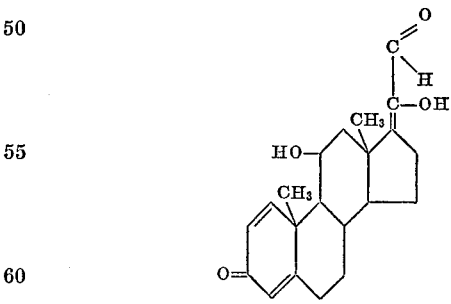

This compound separates from the solution and, accordingly, the solution cannot be used for pharmaceutical purposes.

The pH value of the aqueous solution of 21-deoxy-21-N-(N'-methylpiperazinyl) - prednisolone monohydrochloride, prepared according to the present invention, is 5.1. At this pH value decomposition does not occur and the aqueous solution can be stored for a long period.

A further advantage of the process of the invention is that the 5 to 10 percent quantities of steroid base dissolved in the mother liquor, as well as the minor amounts of hydrochloride still dissolved in the dry solvent can also be separated, purified and utilized. According to the invention, the dissolved steroid base or the monohydrochloride is converted to 21-deoxy-21-N-(N'-methylpiperazinyl)-prednisolone dihydrochloride, which latter is practically insoluble in organic solvents. This product is separated and utilized as follows (two alternatives):

(a) 21-deoxy-21-N-(N'-methylpiperazinyl) - prednisolone dihydrochloride is suspended in dry ethanol, thereafter the pH of the mixture is adjusted to 5.1 by adding an equimolar quantity of free steroid base in ethanol. On the addition of 21-deoxy-21-N-(N'-methylpiperazinyl)-prednoisolone base, the solids initially dissolve, then after some minutes the formed 21-deoxy-21-N-(N'-methylpiperazinyl)-prednisolone monohydrochloride begins to precipitate. This product is separated and purified according to known techniques.

(b) 21-deoxy-21-N-(N'-methylpiperazinyl) - prednisolone base is liberated from the dihydrochloride with an alkali metal hydroxide, then the pH of the alkaline solution is adjusted to a value corresponding to the pH of the pure monohydrochloride solution. For this purpose ethanolic hydrochloric acid is used.

The advantages of the present process, compared to the methods known in the prior art, can be summarized as follows:

(a) Compared to the known process, which provides the steroid base with not more than 70% yield, 21-deoxy-21-N-(N'-methylpiperazinyl)-prednisolone can be prepared according to the invention with a yield of 90 to 95%, in a purity grade of at least 97 percent. Accordingly, the purification of the obtained free base is not necessary; the crude product can be directly used for the preparation of pharmaceutically acceptable salts usable for the preparation of aqueous pharmaceutical products.

(b) The separated product is easily filterable so that oxidic by-products do not form.

(c) Compared to aqueous working-up systems, solubility losses do not occur in the present process.

(d) The betaine-type by-product of vivid yellow color remains in the solution.

EXAMPLE

Prednisolone-21-mesylester 1000 g. of prednisolone are dissolved in 8750 ml. of pyridine under nitrogen atmosphere and vigorous stirring. The solution is cooled to $-10°$ C., then 285 ml. of methane-sulfonic acid chloride are added within about 20 to 25 minutes in such a rate, that the temperature of the mixture is maintained at $-2$ to $0°$ C. The mixture is stirred for additional 3 hours under nitrogen atmosphere, then the suspension is poured into about 40 ml. of ice water. The separated substance is centrifuged and washed successively with water, 2 N hydrochloric acid and water again. The obtained pyridine free prednisolone-21-mesylester is dried in vacuo at a temperature below $50°$ C.

Yield: 1160 g. (95.3%), M.P.: 198–200° C. The obtained product can be directly used in the following step.

21-deoxy-N-(N'-methylpiperazinyl)-prednisolone 1160 g. of prednisolone-21-mesylester are suspended in the mixture of 4420 ml. of acetonitrile and 3840 ml. of benzene, thereafter 927 g. of N-methylpiperazine and 20 g. of sodium iodide are added to the suspension under nitrogen atmosphere and vigorous stirring. The mixture is heated to 57–60° C. within 20 to 30 minutes. During this period the mixture initially turns clear, then begins the rapid separation of 21-deoxy-21-N-(N'-methylpiperazinyl)-prednisolone. After 4 hours of heating, the separated product is filtered off, washed with acetonitrile-benzene mixture of the above composition, and the white, crystalline 21-deoxy-21-N-(N'-methylpiperazinyl)-prednisolone is dried in vacuo at a temperature below 50° C.

Yield: 1111 g. (94.9%), M.P.: 217–220° C. (decomposition), purity grade: 97%.

The mother liquor and the wash are combined, and the obtained solution is evaporated. The residue is triturated well with water, the solids are filtered off, washed with water and dried. The obtained 106 g. of crude 21-deoxy-21-N-/N'-methylpiperazinyl/-prednisolone are dissolved in tenfold amount of ethanol, then the practically insoluble 21-deoxy-21-N-(N'-methylpiperazinyl)-prednisolone dihydrochloride is precipitated with excess ethanolic hydrochloric acid. Yield: 102 g., M.P.: 246–250° C. (decomposition).

21-deoxy-21-N-(N'-methylpiperazinyl)-prednisolone monohydrochloride (a) 1111 g. of 21-deoxy-21-N-(N'-methylpiperazinyl)-prednisolone are dissolved in 1400 ml. of dry ethanol at a temperature below 70° C. The slightly yellowish solution is decolorized with 20 g. of carbon, then the pH of the solution is adjusted to $5.1 \pm 0.3$ with ethanolic hydrochloric acid under stirring. During this procedure the pH of the solution is controlled with an electric pH-meter, as well as visually using an appropriate indicator. Thereafter the mixture is stirred at 5 to 10° C. for additional 5 to 10 hours. The separated product is filtered off and washed with cold (max. 10° C.) ethanol until colourless wash is obtained. The product is dried in vacuo at a temperature below 60° C. to constant weight. 1079 g. (90%) of 21-deoxy-21-N-(N'-methylpiperazinyl)-prednisolone monohydrochloride are obtained, M.P.: 236–240° C. (decomposition).

The monohydrochloride still dissolved in the ethanol solution is separated in the form of the practically insoluble dihydrochloride. The pH of the ethanolic mother liquor is adjusted to 1.5–2, the separated 21-deoxy-21-N-(N'-methylpiperazinyl)-prednisolone dihydrochloride is filtered off, washed well with ethanol and dried. Yield: 48 g.

(b) 150 g. of 21-deoxy-21-N-(N'-methylpiperazinyl)-prednisolone dihydrochloride are suspended in 2000 ml. of ethanol, then a solution of 200 g. of 21-deoxy-21-N-(N'-methylpiperazinyl)-prednisolone in 3000 ml. of ethanol is added to the mixture. After addition of the steroid base, the suspension temporarily turns clear, then begins the rapid precipitation of 21-deoxy-21-N-(N'-methylpiperazinyl)-prednisolone monohydrochloride. The pH of the mixture is adjusted to $5.1 \pm 0.3$ with ethanolic hydrochloric acid; during this procedure the pH of the mixture is controlled with an electric pH-meter. The mixture is stirred for additional 5 hours, thereafter the separated substance is filtered off, washed well with ethanol and dried in vacuo at a temperature below 60° C. Yield: 360 g., M.P.: 236–240° C. (decomposition).

(c) 150 g. of 21-deoxy-21-N-(N'-methylpiperazinyl)-prednisolone dihydrochloride are dissolved in 1000 ml. of water, 5 g. of decolorizing carbon are added, and the mixture is filtered. The pH of the clear solution is adjusted to 9.5–10 with 5 N sodium hydroxide under vigorous stirring, at a temperature below 20° C. The separated substance is filtered off, washed with water and dried at a temperature below 60° C.

The obtained base is converted to 21-deoxy-21-N-(N'-methylpiperazinyl)-prednisolone monohydrochloride as described in paragraph (a). Yield: 122 g.

What we claim is:

1. A process for preparing a 21-deoxy-21-N-(N'-methylpiperazinyl)-prednisolone compound, comprising the steps of reacting prednisolone-21-mesylester with N-methylpiperazine in an acetonitrile-benzene mixture containing acetonitrile and benzene in a molar ratio between substantially 60:40 to 40:60 in the presence of at least one substance selected from the group which consists of alkali metal halides and alkaline earth metal halides to form a precipitate of said compound in said mixture; and recovering said compound from said mixture.

2. The process defined in claim 1 wherein said prednisolone-21-mesylester and said N-methylpiperazine are reacted in said mixture at a temperature of about 25° to 80° C. for a period of the order of 4 hours in the presence of an alkali metal iodide to yield said compound.

3. The process defined in claim 2 wherein said temperature is between 50° and 60° C. and said alkali metal iodide is sodium iodide.

4. The process defined in claim 3 wherein 21-deoxy-21-N-(N'-methylpiperazinyl)-prednisolone is recovered from said mixture, further comprising the step of evaporating said mixture after recovery of the 21-deoxy-21-N-(N'-methylpiperazinyl)-prednisolone therefrom to form an additional quantity thereof.

5. The process defined in claim 3 wherein 21-deoxy-21-N-(N'-methylpiperazinyl)-prednisolone is recovered from said mixture, further comprising the steps of dissolving in dry ethanol the 21-deoxy-21-N-(N'-methyl- piperazinyl)-prednisolone to form a solution, reacting said solution at a pH of about 5.1 with an ethanolic acid having an anion capable of forming a pharmaceutically acceptable acid-addition salt with said 21-deoxy-21-N-(N'-methylpiperazinyl)-prednisolone, and recovering said salt from said solution.

References Cited

FOREIGN PATENTS 954,146   4/1964   Great Britain _____ 260—239.5

ELBERT L. ROBERTS, Primary Examiner

U.S. Cl. X.R.

260—397.45